Dec. 27, 1966 G. VOGEL 3,294,923
TELEPHONE SIGNALLING SYSTEMS UTILIZING TUNNEL DIODES
Filed June 12, 1962
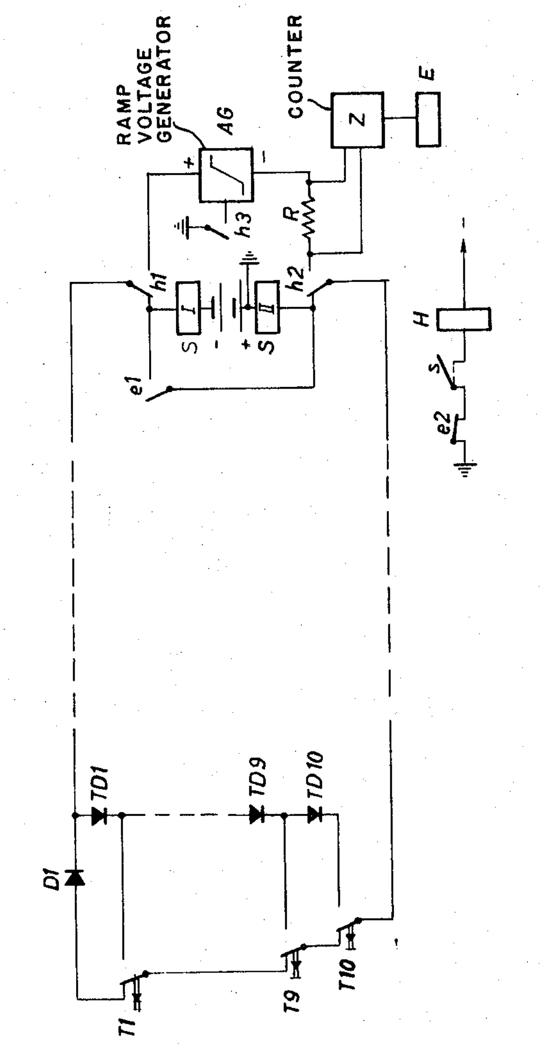
INVENTOR
G. VOGEL
BY Paul W. Hemminger
ATTORNEY United States Patent Office 3,294,923
Patented Dec. 27, 1966

3,294,923
TELEPHONE SIGNALLING SYSTEMS UTILIZING TUNNEL DIODES

Georg Vogel, Schwieberdingen, Ludwigsburg, Germany, assignor to International Standard Electric Corporation, New York, N.Y., a corporation of Delaware Filed June 12, 1962, Ser. No. 201,856
Claims priority, application Germany, June 20, 1961, St 17,973
6 Claims. (Cl. 179—84)

The present invention relates in general to systems for transmitting signals over telephone lines and in particular to telephone systems utilizing tunnel diodes.

Signal transmission in telephones is ideally to be effected in a balanced manner, that is, ground should not be used as a return conductor. This keeps the level of noise influences low. In addition thereto, usually the substation sets of a telephone system have no power supply system of their own.

Various signalling systems of the balanced type are already known which use variations in the loop resistance for balancing. Measuring the loop resistance often gives falsified results due to both the leakage and the series resistance of the line. For this reason only a small number of current ranges can be used with any degree of accuracy. This, in turn, means that only a few signals can be transmitted. In addition thereto, the loop resistance method limits the line to a maximum length.

In other conventional signalling systems the number of signals is increased in that both current directions are utilized for the signal transmission, and in that the interrogation of the transmitting equipments is performed in two timely successive steps of different polarity.

The first mentioned system of the conventional type requires expensive analog measuring equipment for the evaluation purpose, in order to enable a reliable distinction between the different current ranges. The expense of the equipment is increased by the necessity of compensating for the influence of the leakage resistances or of the series resistances of the line. In spite of this considerable expenditure, the known systems still only provide a small store of signals.

The conventional methods employing two or even more interrogating steps not only require a longer interrogation time, but also, expensive analog measuring equipments for both current directions. In addition thereto, these methods are incapable of employing all types of resistance stages. Since certain loop resistances are required for reliably recognizing the beginning and the end of a signal, these loop resistances may not be used in either the one or the other interrogating current direction. The stock of signals, therefore, has not been increased in the manner as expected.

It is one object of the present invention to provide a signalling system operating on a digital basis and, therefore, requiring simpler receiving equipments.

It is a further object of this invention to provide a signalling system utilizing tunnel diode circuitry having a greater signal stock. In this connection, it should be noted that in the case of a tunnel diode subsequent to exceeding the peak current the voltage drop at the tunnel diode itself increases suddenly.

In accordance with this invention the signalling system comprises one or more tunnel diodes with different peak currents inserted at the transmitting station during signal transmission. At the beginning of the signal transmission an interrogating voltage originating at the receiving station is received at the transmitting station. The interrogating voltage is applied to the tunnel diodes. Voltage pulses appear when the current through the tunnel diodes exceeds the one or more peak currents of the series connected diodes in the case of predetermined signal currents. These pulses are utilized for the signal evaluation purpose. If, at the transmitting station, a number of tunnel diodes with different peak currents corresponding to the value to be transmitted (1 . . . 10) are switched on, it is possible at the receiving station to count the voltage pulses that appear upon application of a voltage increasing up to a final value. Most appropriately, the voltage pulses are tapped at a resistor arranged in the signal circuit. These pulses oppose the increase in the voltage drop, caused by the increasing interrogating voltage, so that the pulses may be connected via a direction discriminator to counting or evaluating equipment.

According to a further embodiment of the inventive type of signalling system, a signal of an $$\binom{m}{1}\text{-parallel code}$$

(1 out of $m$), is characterized at a transmitting station by a tunnel diode having a certain peak current value. At the receiving end, the appearance of the voltage pulse at the corresponding signal current serves as an evaluating criterion.

The method may be extended to any random $$\binom{m}{n}\text{-code}$$

($n$ out of $m$). A signal of an $$\binom{m}{n}\text{-code}$$

is constituted at the transmitting station by inserting into the signal circuit a number of $n$ certain tunnel diodes having predetermined peak currents. At the receiving station, the signal is characterized by the appearance of the voltage pulses in the respective current ranges.

In order to restrict the selection of the tunnel diodes only to the different kinds but not to different values it is provided by the further embodiment of the signalling method according to the invention, that a start and a stop pulse is obtained via two additional tunnel diodes, featuring the lowest and the highest peak current of all of the employed tunnel diodes. The time position of the remaining voltage pulses between the start and stop pulse is utilized for identifying the signals. According to the invention a separate monitoring circuit is provided for indicating the signalling condition. In the most simple manner the beginning of the signalling is indicated by the interruption of the monitoring circuit, in the course of which the signal-receiving portion is connected via the monitoring element of the receiving station. The end of the signalling is characterised by the interruption of the signal circuit. In order to eliminate mutual interferences, both, the monitoring circuit and the signalling circuit are separated from one another by providing different current directions. As an interrogating voltage there is provided, in accordance with a further embodiment of the inventive signalling method, a direct voltage capable of increasing up to a final value, and which is switched on at the beginning of the signal. The rise time of the interrogating voltage is adapted to the evaluating time required by the signal-receiving portion, and to the build-up time required by the transmission line. In order to obtain the width of the voltage pulses which is necessary for the evaluation, a correspondingly dimensioned capacitor is connected in parallel to the transmitting circuit. When combining both the transmitting and the receiving equipment at the same location, there will be obtained a parallel-series code converter which may be designed in accordance with any random parallel input code and any series output code. The output code may therefore be already adapted in an optimum manner to the subsequently arranged storage devices, etc. Furthermore, it is conceivable to increase the stock of signals by causing, via transmitting contacts of the transmitting equipment, two signalling circuits of different current directions to become effective, comprising one or more switched-on tunnel diodes, and that the evaluation of the thus formed two-stage code signal, is carried out in the course of two successively following interrogating steps of different current direction. The inventive signalling method allows the employment of codes which are capable of being checked and corrected, so that no restrictions will have to be made in this respect. This is not the case with the conventional types of methods, because these methods are incapable of providing the necessary stock of signals.

The signalling method according to the invention will now be explained in detail with reference to a particular example of embodiment. In the following there are only explained in detail the features on which the invention is based. However, it is to be understood that the application of the basic idea of the invention is in no way intended to be restricted to this solution only. Any average person skilled in the art is capable of extending the method to any random codes, and of finding other ways to provide supervisory or monitoring circuits. In the left-hand portion of the drawing there is shown the transmitting station, and in the right-hand portion of the drawing there is shown the receiving station over a circuit that extends from battery through upper winding I of relay S, relay contacts *h*1 in the normal position, transmitting key contacts T1–T10, contacts *h*2 in a normal position and the lower winding II of relay S to ground. The monitoring circuit is closed via the resting positions of the transmitting contacts T1 . . . T10, and via the rectifier D1. For this reason the control relay S is energized at the receiving station. This relay S via its contact *s*, prevents the relay H from being energized. This normal condition remains until any one of the transmitting contacts is operated. The operation of any of the transmitting contacts T1–T10 causes the monitoring circuit to be interrupted. At the receiving station there is deenergized the control or line relay S, and via the contact *s* there is energized the auxiliary relay H. The contacts *h*1 and *h*2 effect the switchover of the line to the signal-receiving stage. The interrogation voltage generator AG is connected via the contacts *h*3. This generator produces a ramp voltage which continuously increases up to a certain final value. As already mentioned hereinbefore, the rise time and the evaluating speed of the counting device Z, as well as the build-up time, are adapted to both the line and the transmitting equipment. Subsequent to the connection of the interrogating circuit, a current starts to flow via the signal circuit, and an increasing voltage drop will appear across the resistor R. If, e.g. the key T1 is actuated at the transmitting station, only the tunnel diode TD1 will be switched on in the signal-transmitting circuit. As soon as the signal current exceeds the peak current of this tunnel diode, there is effected a change of the voltage drop at this tunnel diode. Since the rise of the interrogating voltage counteracts this voltage variation at the tunnel diode, it is possible to achieve with the aid of a suitably dimensioned signal circuit, that the voltage drop across the resistor will drop temporarily, or will at least remain constant. This criterion is evaluated, that is, counted off, via the counting device Z. When arranging the tunnel diodes TD1 . . . TD10 in accordance with the height of their peak current, and when inserting a certain number of them, e.g. 5 (that is TD1 . . . TD5), beginning with the tunnel diode TD1 with the lowest peak current, into the signal circuit, then five voltage pulses appearing in a timely succession, will be registered via the counting device Z during the rise time of the interrogating voltage. In this particular embodiment the number of voltage pulses corresponds to the value of the transmitted signal. Subsequent to the signal evaluation, in other words, upon reaching the final value of the interrogating voltage, it is supervised via the evaluating circuit as to in what time position the signal circuit is being interrupted. This is the case when the operated key (pushbutton) is released at the transmitting station. It is only denoted that in this case, the switching means E will become effective, and that the reconnection of the monitoring circuit is performed via the contacts *e*1 and *e*2. Now the receiving station is ready to receive a new signal.

As may be taken from this description of an example of embodiment, it is possible with the aid of the inventive method to form the most various types of signal codes, as has already been mentioned in the preamble of the specification. With respect to the case where two additional tunnel diodes are employed for one start and stop pulse, it is still to be noted that these two tunnel diodes are inserted into the signal circuit as well as upon each signal. The encoding of the signals is taken over and performed by the remaining ones of the inserted tunnel diodes. With respect to the evaluation there is then decisive the time position of the voltage pulses between the start and the stop pulse. When employing a number of *m* tunnel diodes having certain peak currents, it will be possible to carry out any desired $$\binom{m}{n}\text{-coding}$$

As an evaluating criterion there is utilized the appearance of the *n* voltage pulses at the respective signal currents. Relative thereto it is of advantage, however, when the peak currents have a uniform gradation. By employing the additional start and stop pulse it is possible to substantially increase the signal reliability in the case of such types of modified signalling methods. The evaluation with respect to a certain current may be ensured by the respective time position between the start and stop pulse.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A signalling system for transmitting directory signals over telephone lines comprising transmitting means and receiving means interconnected by at least one pair of said telephone lines, said transmitting means comprising a plurality of transmitting keys serially connected across said pair of lines to make a first path, a plurality of tunnel diodes associated with said keys, contact means responsive to the operation of any of said keys for opening said first path and completing a second path between said pair of lines, said second path comprising a selected number of said associated tunnel diodes, said receiving means comprising interrogation voltage generator means, monitor means operated responsive to the opening of said first path for disconnecting said monitor means and for connecting said interrogation voltage generator means to said second path to apply said interrogation voltage to said selected number of tunnel diodes, counting means operated responsive to the pulses generated by said selected number of tunnel diodes being switched responsive to said interrogation voltage for determining a directory number associated with said operated transmitting keys, and switching means operated responsive to said counting means to disconnect said interrogation voltage generator and to reconnect said monitoring means.

2. In the signalling system of claim 1 wherein said interrogation voltage generator is a ramp front voltage generator.

3. In the signalling system of claim 2 wherein said monitoring means comprises control relay means, said control relay means having a first coil and a second coil, means for connecting said first coil to battery and said second coil to ground to complete a circuit for operating said control relay through said first path, auxiliary relay means operated responsive to said control relay being in an unoperated condition, and means responsive to the operation of said auxiliary relay means for disconnecting said control relay means from said pair of lines connecting said control relay to said first path and for connecting said interrogation voltage generator means to said second path.

4. In the signalling system of claim 3 wherein resistor means are connected in series with said interrogation voltage generator means and said second path, and means for connecting said counting device across said series resistor means.

5. In the signalling system of claim 4 wherein contact means are provided to operate responsive to said switching means to return said auxiliary relays to a non-operated condition and to reoperate said control relay thereby reconnecting said monitoring circuitry.

6. In the signalling system of claim 1 wherein said tunnel diodes are serially connected.

References Cited by the Examiner

UNITED STATES PATENTS

| | | | |
|---|---|---|---|
| 2,812,383 | 11/1957 | Buchner. | |
| 2,957,952 | 10/1960 | Jaeger | 179—90.3 |
| 3,094,630 | 6/1963 | Rapp et al. | 307—88.5 |
| 3,094,631 | 6/1963 | Davis | 307—88.5 |

KATHLEEN H. CLAFFY, *Primary Examiner.*

NEIL C. READ, ROBERT H. ROSE, *Examiners.*

P. XIARHOS, J. W. JOHNSON, H. ZELLER, *Assistant Examiners.*